United States Patent [19]

Buck et al.

[11] 4,069,874

[45] Jan. 24, 1978

[54] SWIVEL HITCH FOR CHISEL PLOWS

[76] Inventors: Wayne Buck; Vernon I. Waterman, both of Melbourne, Iowa 50162

[21] Appl. No.: 700,314

[22] Filed: June 28, 1976

[51] Int. Cl.$^2$ .................. A01B 59/043; A01B 63/116
[52] U.S. Cl. .................................. 172/450; 172/677; 172/457; 172/748; 172/451
[58] Field of Search ............. 172/450, 677, 678, 679, 172/680, 708, 748, 762, 763, 605, 451, 457

[56] References Cited

U.S. PATENT DOCUMENTS

| Re. 22,627 | 4/1945 | McKay | 172/450 X |
|---|---|---|---|
| 2,673,535 | 3/1954 | Riddle et al. | 172/450 X |
| 2,690,109 | 9/1954 | Frevik et al. | 172/450 X |
| 2,729,469 | 1/1956 | Wilson | 172/450 X |
| 2,745,330 | 5/1956 | Nelson | 172/450 X |
| 2,762,284 | 9/1956 | Fraga | 172/450 X |
| 2,872,990 | 2/1959 | Fraga | 172/449 |
| 2,914,342 | 11/1959 | Silver et al. | 172/450 X |
| 3,037,357 | 6/1962 | Knapp et al. | 172/498 X |
| 3,056,458 | 10/1962 | Gray | 172/450 X |

*Primary Examiner*—George J. Marlo
*Attorney, Agent, or Firm*—Zarley, McKee, Thomte, Voorhees & Sease

[57] ABSTRACT

A swivel hitch for chisel plows comprising a pair of vertically spaced flat plates secured at their rearward ends to the transversely extending frame member or tool bar of the chisel plow and having a flat bar pivotally received therebetween. The opposite ends of the flat bar are positioned outwardly of the flat plates and are adapted to be connected to the lower arms of the tractor three-point hitch. The upper arm of the tractor three-point hitch is secured to the existing clevis element secured to the plow frame member or tool bar. A pair of bolts may be extended through the flat plates and the bar for safety purposes during transport.

5 Claims, 4 Drawing Figures

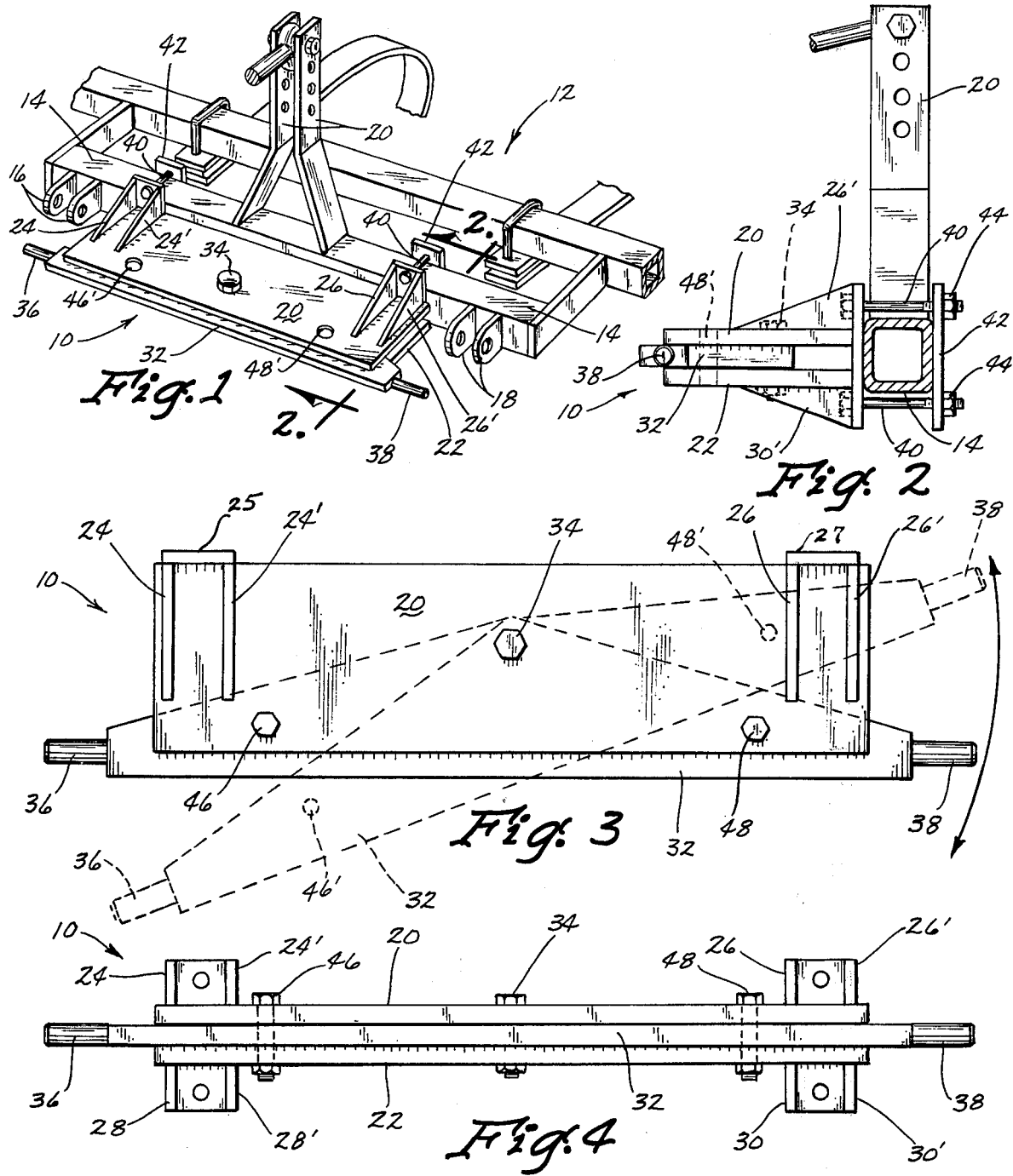

SWIVEL HITCH FOR CHISEL PLOWS

BACKGROUND OF THE INVENTION

This invention relates to a hitch for a chisel plow and more particularly to a swivel hitch for a chisel plow.

Chisel plows or the like are normally connected to a tractor by a conventional three-point hitch assembly. The three-point hitch assembly makes it extremely difficult to turn in tight circles when the plow is in ground engagement. The tractor operator must normally apply one of the wheel brakes of the tractor in an attempt to make the turn.

Therefore, it is a principal object of the invention to provide a swivel hitch for a chisel plow which permits the plow to be turned in a smaller circle.

A further object of the invention is to provide a swivel hitch for chisel plows which reduces the wear on the tractor brakes.

A further object of the invention is to provide a swivel hitch for a chisel plow which permits the chisel plow to swivel with respect to the three-point hitch assembly of the tractor.

A still further object of the invention is to provide a swivel hitch for a chisel plow which is economical to manufacture and durable in use.

BRIEF DESCRIPTION OF THE DRAWINGS

FIG. 1 is a front perspective view of the swivel hitch of this invention secured to a chisel plow:

FIG. 2 is an enlarged sectional view seen on lines 2—2 of FIG. 1;

FIG. 3 is a top elevational view of the hitch with the broken lines illustrating the pivotal movement of the flat bar; and FIG. 4 is a front view of the swivel hitch.

SUMMARY OF THE INVENTION

A swivel hitch is disclosed which is adapted to be secured to the laterally extending frame member or tool bar of the chisel plow or the like. The swivel hitch comprises a pair of vertically spaced flat plates which are secured at their rearward ends to the chisel plow frame member. A flat bar is received between the flat plates and is pivotally secured thereto about a substantially vertically disposed axis. The opposite ends of the flat bar may be connected to the lower arms of the tractor three-point hitch. The upper arm of the tractor three-point hitch is secured to the existing clevis element extending upwardly from the chisel plow frame member. The pivotal connection between the flat bar and the flat plates enables the chisel plow to swivel with respect to the tractor as the tractor is negotiating a turn to enable the tractor to turn in a smaller circle. The relationship of the flat bar and the flat plates permits the chisel plow to be raised out of ground engagement by the tractor three-point hitch in customary fashion. Means is provided for preventing the pivotal movement of the bar with respect to the plates for transport purposes.

DESCRIPTION OF THE PREFERRED EMBODIMENT

The swivel hitch of this invention is referred to generally by the reference numeral 10 and is designed to be attached to a chisel plow or the like referred to generally by the reference numeral 12. Plow 12 includes a laterally extending frame member or tool bar 14. Frame member 14 includes a pair of spaced-apart clevis elements 16 and 18 which are normally adapted to be connected to the lower arms of the tractor three-point hitch (not shown). The numeral 20 refers to a clevis element extending upwardly from the frame member 14 which is adapted to be connected to the upper arm of the tractor three-point hitch.

Swivel hitch 10 comprises a pair of flat plates 20 and 22 which are normally disposed and vertically spaced. plate 20 is provided with a pair of spaced-apart brackets 24 and 24' at one end thereof and a pair of spaced-apart brackets 26 and 26' secured thereto at the opposite end thereof. Plate 22 is provided with a pair of spaced-apart brackets 28 and 28' at one end thereof and a pair of spaced-apart brackets 30 and 30' at the other end thereof. Bar 25 is welded to brackets 24, 24' and 28, 28' while bar 27 is welded to brackets 26, 26' and 30, 30'. Bar 32 is received between the forward ends of the plates 20 and 22 and is pivotally secured thereto about a substantially vertically disposed axis by means of bolt or pin 34 extending therethrough. As seen in the drawings, the rearward end of bar 32 is V-shaped to permit a greater amount of pivotal movement between the bar 32 is V-shaped to permit a greater amount of pivotal movement between the bar 32 and the plates 20 and 22. The opposite ends of the bar 32 are provided with elements 36 and 38 adapted to be conneceted to the lower arms of the tractor three-point hitch.

Hitch 10 is secured to frame member 14 as illustrated in FIGS. 1 and 2. As seen in the drawings, bolt 40 are extended through the bars 25 and 27 and have plates or bars 42 received on the rearward ends thereof and maintained thereon by nuts 44. Thus, the plates 20 and 22 are selectively clamped onto the frame member 14 which enables the hitch 10 to be mounted on existing implements without extensive modification thereof.

With the hitch 10 mounted on the frame member 14 is illustrated in FIG. 1, the elements 36 and 38 are connected to the lower arms of the tractor three-point hitch and the upper arm of the tractor three-point hitch is secured to the upper end of clevis 20. When the tractor is making a turn, bolt 34 permits the plates 20 and 22 and the chisel plow to swivel with respect to the tractor and the bar 32 so that the tractor can turn in a much smaller circle than if the conventional three-point hitch were utilized. The relationship of the flat bar 32 to the flat plates 20 and 22 permits the chisel plow 12 to be raised and lowered with respect to the ground through the conventinal three-point hitch.

Bolts 46 and 48 may be extended through registering openings 46', 46' and 48', 48') formed in the plate 20, bar 32 and plate 22 when the implement is to be transported over the road for safety purposes. With the bolts 46 and 48 installed, the swivel action is prevented. Thus, it can be seen that a novel swivel hitch has been provided for a chisel plow or the like which permits the tractor to turn in a much smaller circle than ordinarily possible. It can also be seen that the swivel hitch accomplishes at least all of its stated objectives.

I claim:
1. In combination,
    an agricultural implement having a transversely extending frame member, said frame member including means for connection to the upper arm of a tractor three-point hitch,
    and a swivel hitch assembly operatively secured to said frame member, said swivel hitch assembly comprising upper and lower spaced-apart plates having rearward and forward ends and opposite ends, said plates being secured at their rearward ends to said frame member; a substantially horizontally disposed and transversely extending flat bar received between said plates and pivotally secured at its center length thereto, about a substantially vertically disposed axis located centrally of the plates; said bar being as long as said plates permit said plates to resist vertical pivoting of said bar with respect to said plates and having means at its opposite ends for connection to the lower arms of the three-point hitch whereby said implement may pivot with respect to said tractor three-point hitch as said tractor is turning.

2. The combination of claim 1 wherein said plates are removably clamped onto said frame member.

3. The combination of claim 1 wherein said flat bar has its opposite ends extending laterally of said plates.

4. The combination of claim 1 wherein said implement is a chisel plow.

5. The combination of claim 1 wherein said flat bar has a V-shaped rearward end.

* * * * *